(No Model.)

W. BRISCOE.
BALL BEARING.

No. 561,861. Patented June 9, 1896.

Witnesses
Charles DeBow
Hamilton D. Turner

Inventor
William Briscoe
by his Attorneys
Howson & Howson

UNITED STATES PATENT OFFICE.

WILLIAM BRISCOE, OF PHILADELPHIA, PENNSYLVANIA.

BALL-BEARING.

SPECIFICATION forming part of Letters Patent No. 561,861, dated June 9, 1896.

Application filed October 29, 1895. Serial No. 567,286. (No model.)

*To all whom it may concern:*

Be it known that I, WILLIAM BRISCOE, a citizen of the United States, residing in Philadelphia, Pennsylvania, have invented certain Improvements in Ball-Bearings, of which the following is a specification.

The object of my invention is to so construct a ball-bearing as to render the same free-running under all conditions of use, an object which I attain in the manner hereinafter set forth, reference being had to the accompanying drawings, in which—

Figure 1:
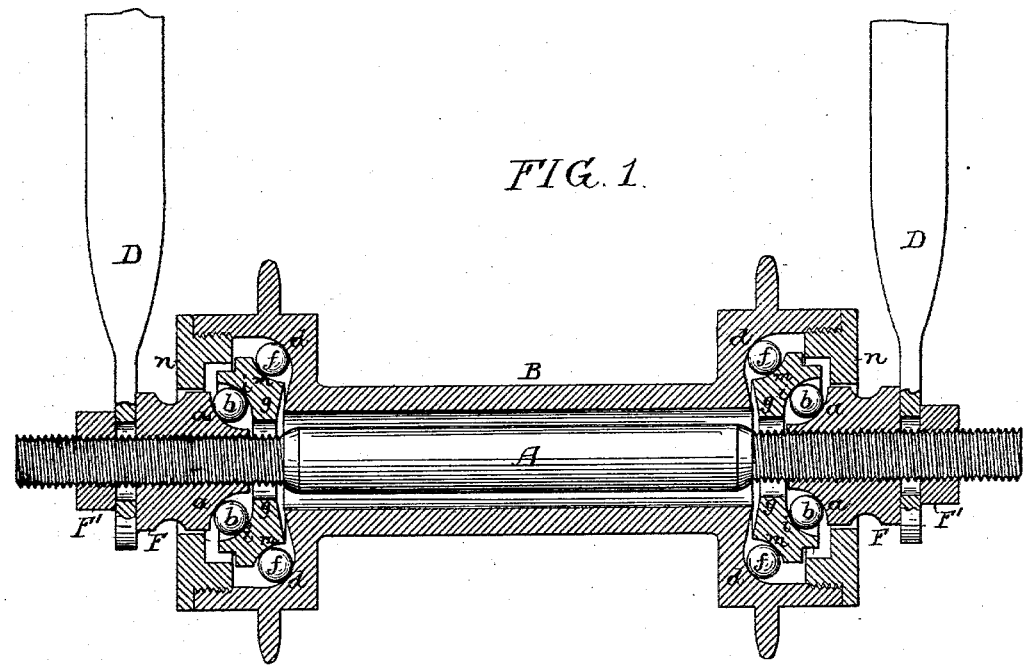
Figure 2:
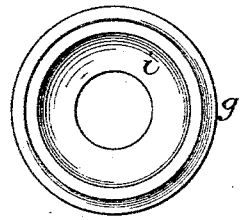
Figure 3:
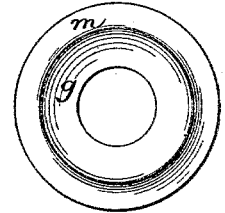

Figure 1 is a longitudinal section of a ball-bearing for vehicles constructed in accordance with my invention, and Figs. 2 and 3 are respectively a front and rear view of a ring forming one of the novel features of my improved bearing.

In Fig. 1, A represents part of a shaft or axle, and B the hub of a wheel intended to turn around the same, said shaft or axle being rigidly mounted upon depending bars or hangers D, forming part of the fixed frame of the vehicle. The part B might, however, be the fixed part and the part A the rotating part, as in the case of crank-shaft hangers or other cases where a rotating shaft is used.

The shaft A is threaded at its opposite ends for the reception of adjustable blocks or cones F, between which and outer nuts F' the ends of the hanger-frames D are confined, and these blocks F have at their inner ends races $a$ for the reception of an annular series of balls $b$.

The ends of the hub are enlarged in diameter, and in these enlarged ends of the hub are formed races $d$ for the reception of an annular series of balls $f$, or, if desired, these ball-races $d$ may be formed in cups let into the hub, as sometimes practiced. Between the inner series of balls $b$ and the outer series of balls $f$ is interposed a ring $g$, having inner and outer ball-races $i$ and $m$, the race $i$ for the reception of the balls $b$ and the race $m$ for the reception of the balls $f$, and the outer portion of each of the enlarged ends of the hub is threaded for the reception of a screw plug or cap $n$, which, while not in actual contact with the block F, fits so closely thereto as to prevent the access of dust to either set of balls or to the interposed ring. This cap $n$ also prevents the escape of the ring $g$ or of the outer set of balls $f$ when the block F is removed in order to release the inner set of balls $b$.

When the hub is rotated, the ring $g$ will normally remain stationary as long as the balls run freely in the races and there is no drag or pull upon either set of balls; but as soon as there is any draft or pull which would tend to cause friction between the balls and the ring the latter will turn and will thus prevent such friction. Hence the easy running of the bearing under all conditions is assured.

It will be observed that the outer ball-races $d$ formed in the hub are flared or beveled, so that the balls will have a tendency to seek the outer portions of each race when the latter is held horizontally and face upward, so that the ring $g$ can be readily applied to the set of balls $f$ after the latter are in place.

Although I have shown my invention as applied to a bearing having but a single ring interposed between two sets of balls, the invention is applicable to bearings having two or more of such rings with balls interposed between them; but such multiplicity of interposed rings with interposed sets of balls is to be considered as simply an equivalent of the single ring, and therefore within the scope of my claims.

Having thus described my invention, I claim and desire to secure by Letters Patent—

1. The combination of the fixed and rotating elements of a ball-bearing, with two sets of balls, one set adapted to a ball-race on the fixed element, and the other to a ball-race on the rotating element, one of said ball-races being movable and serving to simultaneously adjust both sets of balls, a ring interposed between the two sets of balls and having ball-races for each, said ring being free to turn independently of the rotating element of the bearing, and a removable cap carried by one of the elements of the bearing and serving to retain in place the ring and one set of balls when the adjustable ball-race and the other set of balls have been withdrawn, substantially as specified.

2. The combination of a shaft and hub, one fixed, and the other rotatable, two sets of balls, one set adapted to a ball-race on the shaft, and the other to a ball-race on the hub, and an interposed ring free to rotate independently of the rotating element of the bearing, and having ball-races for both sets of balls, the ball-race on the hub being flared outwardly and away from the end of the bearing so that the balls will naturally be directed to the part of the bearing farthest from the axial center of the hub, substantially as specified.

In testimony whereof I have signed my name to this specification in the presence of two subscribing witnesses.

WILLIAM BRISCOE.

Witnesses:
WILL. A. BARR,
JOS. H. KLEIN.